United States Patent [19]

Carlson

[11] 4,323,034
[45] Apr. 6, 1982

[54] DOG JUMP APPARATUS

[75] Inventor: Bertyl W. Carlson, Minneapolis, Minn.

[73] Assignee: Acme Machine Company, Minneapolis, Minn.

[21] Appl. No.: 178,770

[22] Filed: Aug. 18, 1980

[51] Int. Cl.³ .................... A01K 15/02; A63B 5/02
[52] U.S. Cl. ...................... 119/29; 272/103; 248/297.2
[58] Field of Search ............. 119/29; 272/62, 64, 272/101, 102, 103; 211/123, 208; 248/219.1, 219.3, 297.2, 408

[56] References Cited

U.S. PATENT DOCUMENTS

| 1,146,843 | 7/1915 | Brown | 272/103 |
| 1,632,036 | 6/1927 | Mullen | 248/297.2 X |
| 1,910,080 | 5/1933 | Austin | 272/103 |
| 2,827,116 | 3/1958 | Zalovcik | 272/103 X |
| 3,394,932 | 7/1968 | Leflar | 272/103 |
| 3,712,652 | 1/1973 | Uilkema | 287/58 CT |
| 3,865,338 | 2/1975 | Campbell | 248/297.2 |

FOREIGN PATENT DOCUMENTS 2388578 11/1978 France .................................. 119/29

OTHER PUBLICATIONS

Illustration AKC Suggested Construction of Broad Jump.
Illustration AKC Suggested Construction of Bar Jump.

Primary Examiner—Gene Mancene
Assistant Examiner—Robert P. Swiatek
Attorney, Agent, or Firm—Kinney, Lange, Braddock, Westman and Fairbairn

[57] ABSTRACT

The present invention relates to equipment used in the training of dogs. The invention comprises a jump apparatus which has a pair of channel shaped legs. Each leg is mounted on a base panel so that the leg is maintained in a generally upright manner. The channel configuration of each leg forms a slot which is suitable for selectively accepting and retaining one of a pair of support devices for a cross bar and for selectively positioning one end of a plurality of high jump panels in a generally vertical plane.

8 Claims, 6 Drawing Figures

DOG JUMP APPARATUS

BACKGROUND OF THE INVENTION

1. Field of the Invention

The present invention relates to equipment employed in the training of dogs, and specifically to an improved jump apparatus which is capable of functioning both as a dog training bar jump and dog training high jump.

2. Prior Art

In order to provide a uniform means for the comparison of dogs at obedience trials, the American Kennel Club (AKC) has established performance and equipment standards for such events. Dogs competing in AKC obedience trials are required to perform several tests involving jumps over stationary barriers. Similar barriers, therefore, must be employed by those who train dogs for participation in obedience trials so that the dog will be properly prepared for competition. Because dogs come in all shapes and sizes, these stationary barriers must be adjustable in order to facilitate use with different breeds and many obedience schools find that the maintenance and storage of such training equipment are major problems. Several sets of barrier jumps may be needed, and keeping them in constant repair and looking somewhat presentable is a nuisance.

An AKC publication illustrates the "Suggested Construction of Bar Jump" that will meet AKC standards. This is the official AKC bar jump which trainers must prepare their animals to perform on in competition. It is relatively unstable, as well as being difficult to store and transport. In addition, the use of these official AKC regulation bar jumps for training causes a great deal of wear and tear on such equipment, which was not designed for such constant use. This in turn presents a repair and maintenance problem for the dog handler.

One attempt to improve on the AKC regulation equipment is illustrated in U.S. Pat. No. 2,827,116. The multi-purpose dog training equipment taught in this patent consists of a unitary frame having both legs of the jump attached to a common base. Rather than the AKC regulation rectangular high bar, this patent shows a circular bar with pins at its ends which fit into slots in the legs of the unitary frame. In addition, the high jump barrier of this patent is composed of a canvas panel.

Although not specifically relating to dog training equipment, two other U.S. Pat. Nos. 1,146,843 and 3,394,932 illustrate hurdle or high jump devices with adjustable horizontal members. Both patents also employ a spring biased detent pin for selectively positioning their respective horizontal members. U.S. Pat. No. 3,712,652, a mechanism for selectively securing telescoping inner and outer tubular members of an adjustable ski pole, also shows a spring urged detent pin locking mechanism. Unlike the present invention, these three patents all involve inner and outer members, generally tubular, which slide over each other and are locked by a spring and pin device.

The present invention alleviates many of the problems dog handlers and trainers have faced with prior art equipment. It is simple to use, store, transport and manufacture. Because it is so sturdy, little repair is required and little maintenance is necessary to keep the equipment looking presentable.

SUMMARY OF THE INVENTION

The present invention is a dog jump apparatus for the training of dogs. The apparatus consists of a pair of channel shaped legs with each leg connected to one of a pair of base panels which positions the leg in an upright manner. The channel configuration of each of the legs forms a slot which is suitable for selectively accepting and retaining one of a pair of support devices for a cross bar and for selectively positioning one end of each of a plurality of high jump panels in a generally vertical plane. One of the high jump panels has separate brackets on each end which conform generally to the outer dimensions of the legs so that when the panel is positioned in the channel slots the brackets fit generally about the legs to hold the legs in a predetermined parallel relation. By placing this panel and bracket arrangement on the legs, and adding at least one additional high jump panel in the channel slots of the legs, a suitable high jump is assembled for the use and training of dogs. In addition, the height of the high jump may be varied by removing or adding additional high jump panels.

To use the dog hurdle apparatus as a bar jump, a pair of support devices, each of which has a spring urged detent lug, are inserted in the top of the channels so that each detent lug is urged against the base wall of the channel. Each channel contains a plurality of holes for receiving the lug, and the spring means is resilient so that the detent lug may be disengaged from a hole and the support device slidably moved to a different position on the axial length of the leg. Each support device also has a cross bar support rod which together serve to nonrigidly maintain a cross bar between the two legs.

DETAILED DESCRIPTION OF THE PREFERRED EMBODIMENTS

Figure 1:
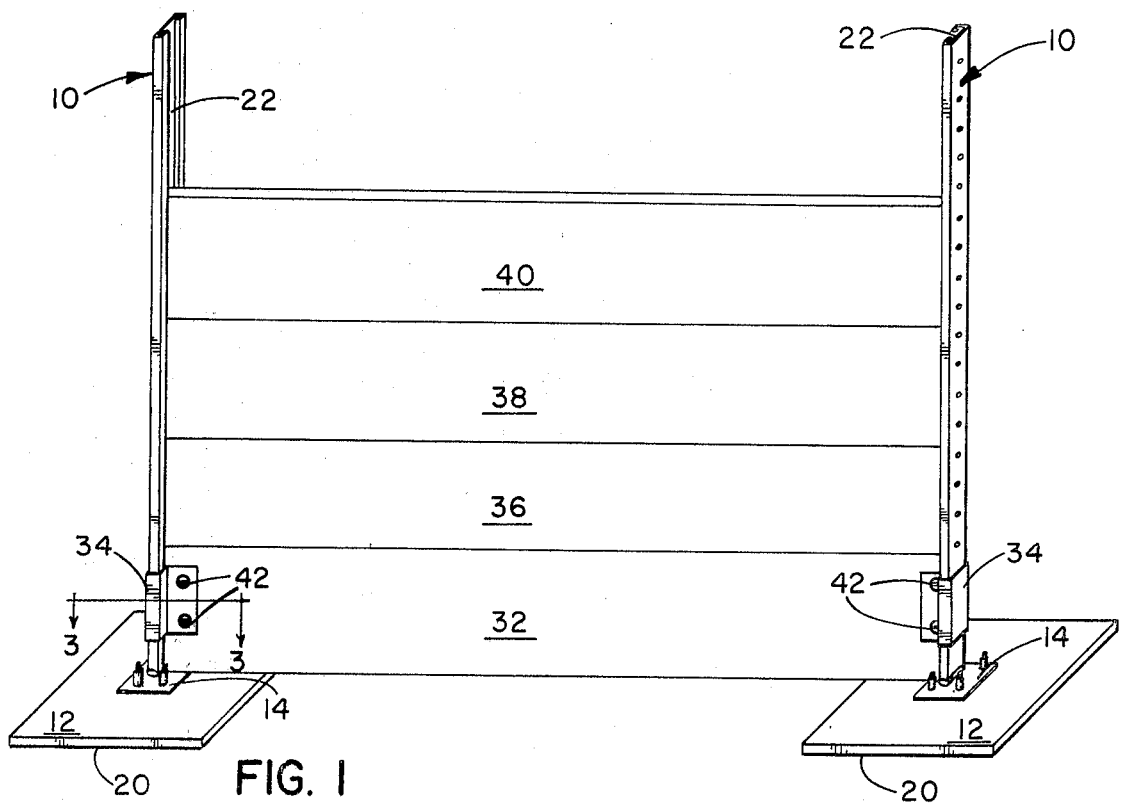
FIG. 1 is a perspective view of the dog jump apparatus functioning as a high jump.
Figure 2:
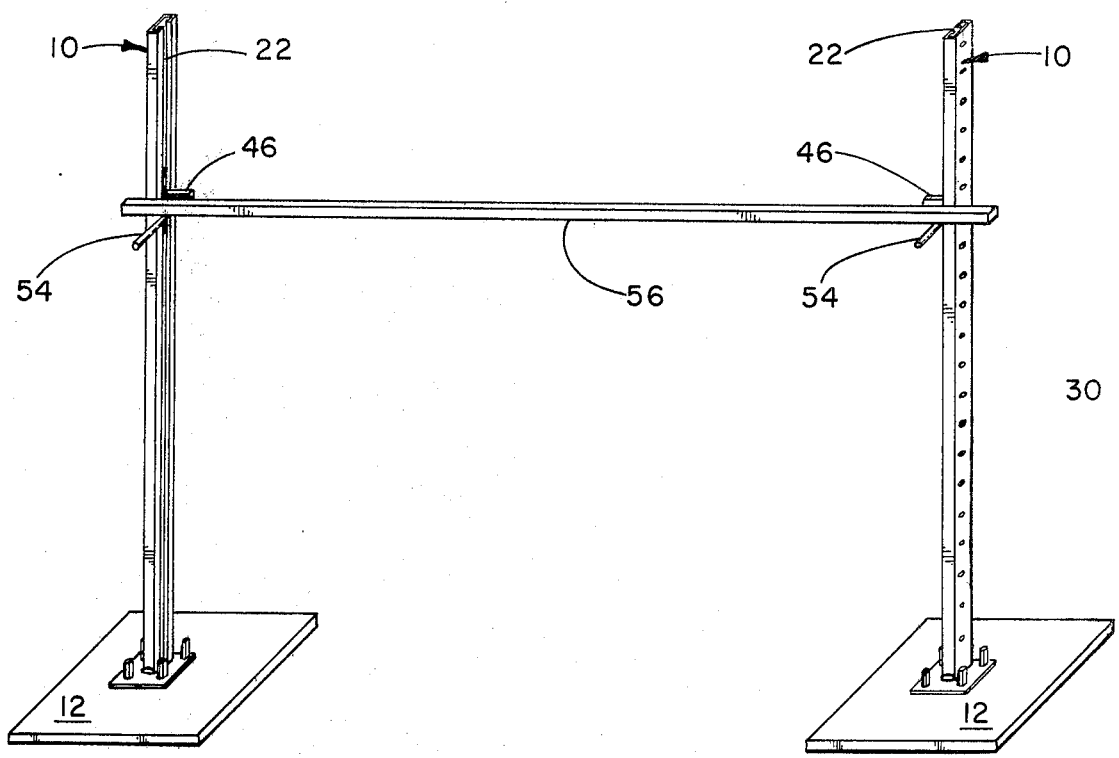
FIG. 2 is a perspective view of the dog jump apparatus functioning as a bar jump.
Figure 3:
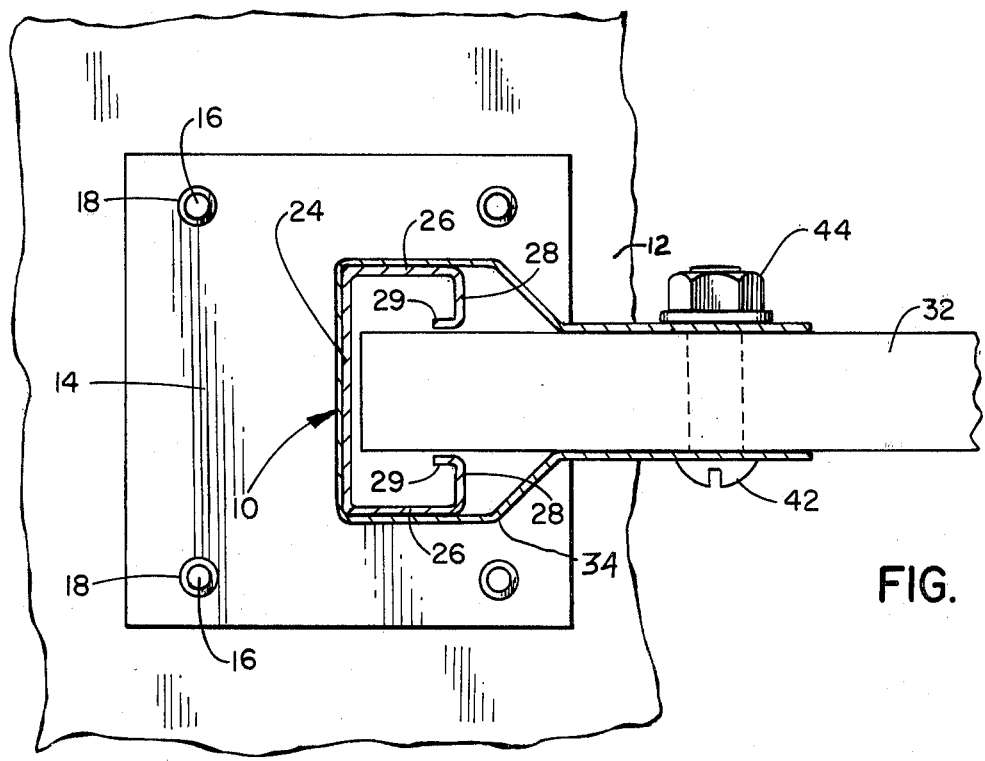
FIG. 3 is a sectional view along section 3—3 of FIG. 1.

FIGS. 1 and 2 show the two functional uses of the dog jump apparatus. In FIG. 1, the jump apparatus is shown as a high jump, and in FIG. 2, the jump apparatus is shown as a bar jump. The jump or hurdle apparatus is basically composed of a pair of channel shaped legs 10,10 and a pair of bases 12,12. Each leg 10 is connected to a base 12 by a bracket plate 14 so that the leg is maintained in a generally upright manner. The lower end of the leg 10 is rigidly attached to bracket plate 14 and the plate is in turn, secured to the base 12 by suitable means, such as bolts 16 and nuts 18, as shown in FIG. 3. To protect floors and cut down on noise, the bottom of each base 12 is covered with a cushioned material 20.

Figure 4:
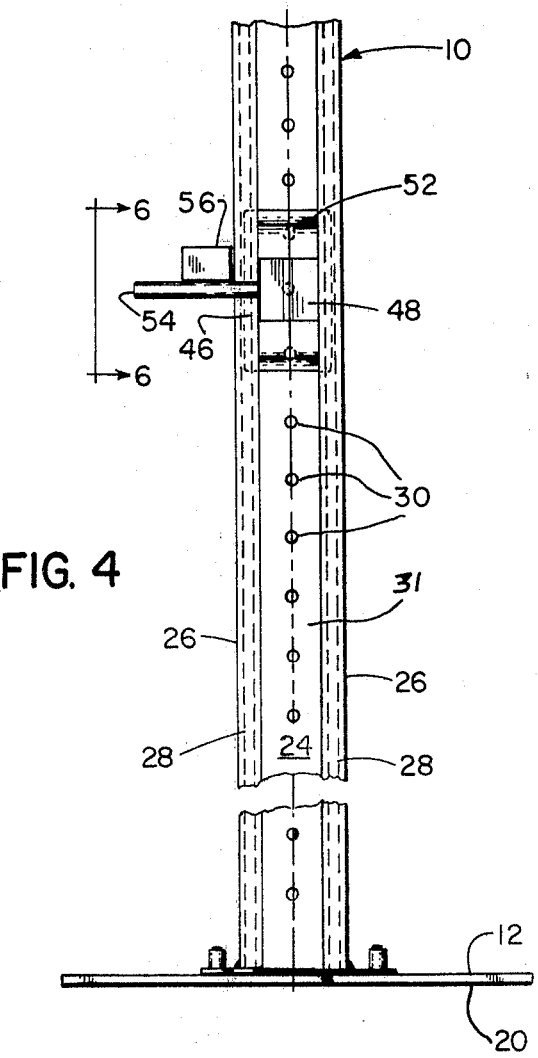
FIG. 4 is a partial side view of one of the legs of the dog jump apparatus in its high bar capacity.
Figure 5:
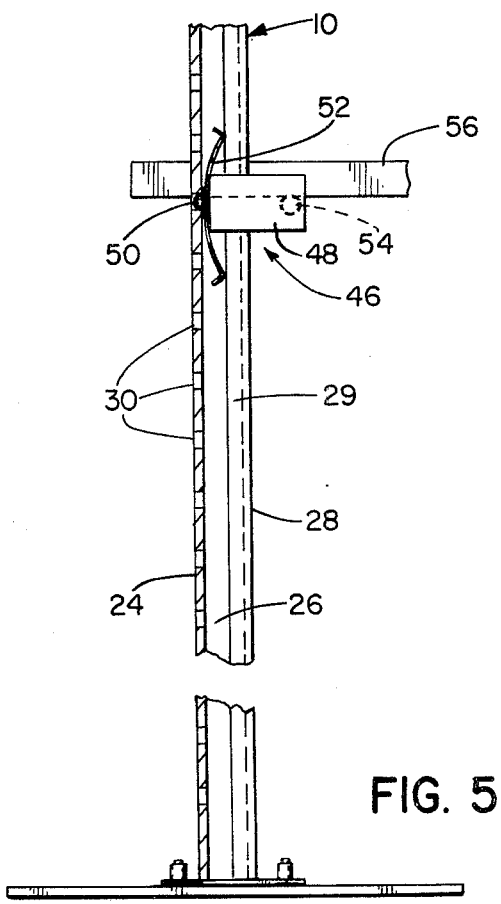
FIG. 5 is a sectional view along the center of the right hand post shown in FIG. 2 looking toward the jump bar.

The channel configuration 22 of each leg 10 is open at the top of the leg, and as shown in FIGS. 4 and 5, comprises a base wall 24, a pair of side walls 26,26 and a pair of wall portions 28,28 generally parallel to the base wall 24. The wall portions 28,28 have lips 29,29 bent inwardly toward the base wall. The lips 29,29 are spaced apart to form a slot 31. The base wall 24 has a plurality of similar holes 30 evenly spaced along a line parallel to the axial length of the leg. The base wall 24 is connected to the two side walls 26, which are each in turn connected to one of the two wall portions 28 having lips 29. The wall portions 28 are generally in a plane parallel to the base wall 24 and extend toward each other, forming slot 31. FIG. 3 shows the relationship between the base wall 24, side walls 26, wall portions 28, and the lips 29 in cross section.

To serve as a high jump, the two legs 10 mounted on their bases 12 are turned such that the slots 31 of their channels 22 are facing each other. A bottom high jump panel 32 is fitted with a pair of separate brackets 34,34 on its ends and the thickness of bottom high jump panel 32 is such that the panel is slidably receivable between lips 29,29 of leg channel 22. In FIG. 3, it can be seen that the form of each bracket 34 conforms generally to the outer dimensions of each leg 10, so that when the end of lower high jump panel 32 is positioned within the channel 22 of upright leg 10, bracket 34 fits around the channel and will hold the end of lower high jump panel 32 and leg 10 together in an assembly, as shown in FIGS. 1 and 3.

Once the assembly of lower high jump panel 32 and brackets 34 is placed about both legs 10, the legs are held in position to receive additional high jump panels 36, 38 and 40. All of the high jump panels are of the same length and thickness, and the operation of the bottom high jump panel 32 and its brackets 34 positions the channels 22 of legs 10 in such a manner as to slidably receive the additional high jump panels so that the dog jump apparatus serves as a rigid vertical barrier of variable height. As shown in FIGS. 3, 4 and 5, each bracket 34 is attached to the end of lower panel 32 by suitable means, such as bolts 42 and nuts 44.

Figure 6:
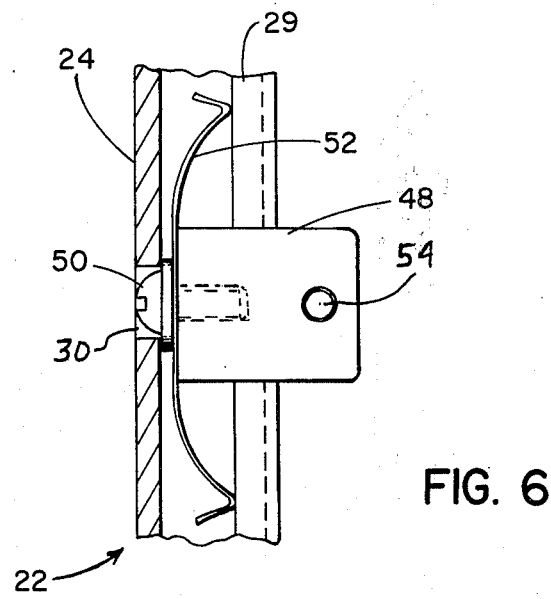
FIG. 6 is an enlarged side view of a bar jump support with the support channel in section and taken as on line 6—6 in FIG. 4.

To serve as a bar jump, the legs 10 are also positioned in such a manner that the slots 31 of channels 22 are facing each other. Instead of placing high jump panels in the channels, however, one of a pair of vertically adjustable support devices 46,46 is positioned in each channel. FIGS. 4, 5 and 6 illustrate the positioning of a support device 46 within the channel of one of the legs. Each support device 46 consists of a body member 48, a detent lug 50, a spring means 52 and a cross bar support rod 54.

The body member 48 of each support device 46 has first and second ends and is of such dimension that the body member is freely acceptable in the slot 31 of the channel 22 between the lips 29,29. The detent lug 50 (which as shown is the head of a machine screw threaded into the body member 48) is mounted on the first end of the body member and positioned in alignment with the center lines of the plurality of holes 30 in the base wall 24 of each leg. The detent lug 50 is proportioned so that it is selectively receivable within each of the holes 30, thereby allowing the support device 46 to be held from sliding along the axial length of the leg at each of the holes 30. In other words, the detent lug 50 may be positioned in any one of the plurality of holes 30 along the length of the leg so as to vary the height of the support device 46 relative to the base 12 or floor.

The body member 48 and detent lug 50 are urged toward the base wall 24 by spring means 52 which is also attached to the first end of the body member 48. In the preferred embodiment, spring means 52 is a leaf spring fixed to the body member by the machine screw forming lug 50. The leaf spring has two free ends engaging the inner edges of the lips 29 of the channel shaped leg in such a manner as to continuously urge the body member 48 and detent lug 50 into contact with the base wall 24 of the leg. The leaf spring 52 is resilient to permit the disengagement of the lug 50 from a hole 30 in the base wall 24 (by moving the body member 48) and allow slidable movement of the support device 46 to align the detent lug 50 with another hole 30 along the axial length of the leg.

Mounted proximate the second end of the body member is a cross bar support rod 54 which provides a means for nonrigidly supporting the bar jump cross bar 56. To properly support the cross bar 56, the two support devices 46 must be positioned along the axial lengths of the legs 10 so that both the support devices are in the same generally horizontal plane. Cross bar 56 is then placed upon cross bar support rods 54 to form a horizontal bar jump.

To move support device 46 along the axial length of the leg 10, a force, generally manual, must be applied to the support device in such a manner as to overcome the force of the spring means 52 pushing the support device against the base wall 24. Once the detent lug 50 is disengaged from the hole 30, the support device 46 may be slid along the axial length of the leg 10 until a desired position is reached. Upon reaching the position desired, the detent lug 50 is received into the new hole 30 to lock the support device in its new position. A similar procedure is followed with the second support device so as to position both devices along the two legs in such a manner that the cross bar 56 is in a generally horizontal plane when placed upon cross bar support rods 54. Note that cross bar 56 is nonrigidly positioned on cross bar support rods 54 so that when a jumping dog fails to clear the cross bar, the bar will fall from the support rods upon being bumped by the dog.

Although the present invention has been described with reference to preferred embodiments, workers skilled in the art will recognize that changes may be made in form and detail without departing from the spirit and scope of the invention.

What is claimed is:

1. A jump apparatus for the training of dogs, the apparatus comprising:
   a pair of channel shaped legs having upper and lower ends;
   a pair of base panels;
   the upper end of each leg being open and the lower end of each leg being connected to one of the base panels so that the legs are positioned in a generally upright manner; and
   the channel configuration of each of the legs forming a slot facing the other leg and being of a size for selectively accepting and retaining one of a pair of support devices for an unsecured cross bar and for selectively positioning one end of each of a plurality of high jump panels in a generally vertical plane.

2. The apparatus of claim 1 in combination with one high jump panel having a separate bracket on each end, the brackets conforming generally to the outer dimensions of the legs so that when the panel ends are positioned in the slots of the channel shaped legs the brackets fit generally about the legs to hold the legs in a predetermined parallel relation.

3. The apparatus of claim 2 and at least one additional high jump panel positioned in the channels of the legs to vary the height of the high jump.

4. The apparatus of claim 1 wherein the channel configuration of each of the legs comprises:
- a base wall having a plurality of similar holes evenly spaced in a line parallel to the axial length of each leg;
- a pair of side walls connected to the base wall; and
- a pair of wall portions each having a lip bent inwardly toward the base wall, the wall portions connected to the side walls and being generally in a plane parallel to the base wall and extending toward each other and in registry with the base wall to form the slot between the wall portions.

5. The apparatus of claim 4 in combination with a pair of support devices and a cross bar supported on the support devices for selectively varying the vertical position of the cross bar relative to a generally horizontal plane, each support device comprising:
- a body member having first and second ends and being of such dimension that the body member is nonrigidly positioned in the channel slot of the leg between the two wall portions;
- a detent lug mounted on the first end of the body member, the lug being positioned in alignment with the plurality of holes in the base wall of the leg and the lug being proportioned so that it is selectively receivable within each of the holes, thereby allowing the support device to be slidably engageable along the axial length of the leg;
- a spring means urging the body member and detent lug toward the base wall of the leg wherein the lug is receivable in one of the holes in the base wall to fix the position of the support device along the axial length of the leg; and
- a cross bar support rod mounted proximate the second end of the body member providing a means for nonrigidly supporting the cross bar.

6. The apparatus of claim 5 wherein the spring means is a leaf spring mounted on the first end of the body member, the leaf spring having two free ends engaging the portions of the channel shaped leg spaced from and in registry with the base wall in such a manner as to continuously urge the body member and detent lug toward the base wall of the leg, and the leaf spring being resilient to permit the disengagement of the lug and hole and the slidable movement of the support device to another hole and position along the axial length of the leg.

7. The apparatus of claim 6 wherein the detent lug comprises the head of a screw threaded into the first end of the body member and protruding from the body member, the screw comprising means for mounting the leaf spring on the body member.

8. A dog jump apparatus kit for the training of dogs, the apparatus comprising:
- a pair of channel shaped legs having upper and lower ends and comprising a base wall and a pair of side members forming a slot and having a plurality of holes in the base wall,
- a pair of base plates;
- the upper end of each leg being open and the lower end of each leg being removably connected to one of the base plates so that the legs are positioned in a generally upright manner and the base plates may be separated for disassembly;
- a pair of support devices, each support device including a body member slidable in the slot between the side members of the channel, a detent lug mounted on a first end of the body member adapted to be received in one of the plurality of holes, spring means carried by the body member urging the detent lug in direction toward the base wall when the body member is in the slot, said spring means and lug being configured to permit moving the lug out of one hole and sliding the body member along the leg and permitting the lug to reenter one of the holes, and a cross bar support rod projecting from the body member to permit supporting a cross bar on the support rods; and
- a plurality of high jump panels, the slots of the legs being of size to receive the end portions of the panels with the panels extending between the legs with the slots of the legs facing each other, one of said panels comprising a lower panel that mounts adjacent the base plates and having means to releasably clamp the legs to the lower-most panel;
- the channel configuration of each of the legs thereby selectively accepting and retaining one of a pair of said support devices for a cross bar and selectively positioning the high jump panels in a generally vertical plane.

* * * * *